Patented Jan. 31, 1928.

1,657,800

UNITED STATES PATENT OFFICE.

ALBERT KEMMLER, OF ESSLINGEN-ON-THE-NECKAR, GERMANY.

PROCESS FOR THE MANUFACTURE OF CHAMOIS TANNED LEATHER.

No Drawing. Application filed September 28, 1926, Serial No. 138,328, and in Germany August 29, 1924.

The invention relates to a chamois tanning process, in accordance with which the skin is depilated in the usual way, and is then tanned with a mixture of extracted egg oil and an aqueous solution of formaldehyde. It is preferred to depilate the skins by the well known method of using lime, followed by bating, but any other appropriate depilating operation (as for instance sweating) may be used. It is true that egg yolks are used in the tanning of glacé leather and egg oil which has been extracted is used in the tanning of Danish leather. It may here be noted that egg yolks, and egg oil which has not been extracted, contain lecithin albumen. Extracted egg oil comes from dried egg yolk, extracted with ether, and it contains no lecithin albumen. Neither the use of egg yolks nor the use of extracted egg oil, mentioned above as heretofore proposed, produces chamois tanned wash leather. The new process on the contrary yields a soft, pliant, velvety and white wash leather without bleaching in the sun on grass.

The leather produced by the new process can also be dyed any colour better and more uniformly than leather tanned with train oil.

In the new process the operations are as follows:

The skin is fulled in a fulling mill with egg oil to which is added ½ to 2 per cent of a 40% solution of formaldehyde according to the thickness of the skin. When the skin has been properly tanned in the egg oil there is no risk that the amount of water contained in the formaldehyde will moisten the skin again as water is unable to penetrate the fibres of the skin which are completely saturated with the egg oil. The formaldehyde which is soluble in egg oil will however penetrate the fibres of the skin owing to the vigorous fulling and as is well known will make it waterproof by its action and the chemical change which takes place, that is to say will tan it.

The whole of the operation consisting in repeatedly fulling thoroughly with the said egg oil containing formaldehyde and hanging up the skin twice, takes at the very most from two to four days according to the thickness of the skin. The skin after being well wrung out can be washed as usual and at the same time freed from grease.

The operations of drying and softening are those commonly employed.

I claim:—

A process for producing chamois tanned leather, comprising depilating the skin in the usual manner, and then tanning the thus treated skin with a mixture of extracted egg oil and aqueous formaldehyde solution.

In testimony whereof I affix my signature.

ALBERT KEMMLER.